April 18, 1933. A. E. GREENE 1,904,683

COMBUSTION ARC PROCESS AND APPARATUS

Filed Jan. 7, 1927

Albert E. Greene
INVENTOR

Patented Apr. 18, 1933

1,904,683

UNITED STATES PATENT OFFICE

ALBERT E. GREENE, OF MEDINA, WASHINGTON

COMBUSTION-ARC PROCESS AND APPARATUS

Application filed January 7, 1927, Serial No. 159,723, and in Canada.

The present application is a continuation in part of my application Serial No. 254,224, filed Sept. 18, 1918 (abandoned in favor of the present application) and of my application Serial No. 121,137, filed July 8, 1926 (Patent No. 1,847,527, dated March 1, 1932).

My present invention relates to the combined use of electric heat and combustion heat, and to the apparatus therefor and the process of working.

My invention relates to the production of an arc from an electrode which may be located in a tuyère in one modification whereby an arc may be formed to a terminal which may be the charge itself, and at the same time whereby a combustion flame may be formed by fuel and air entering thru said tuyère. In one modification my invention consists in maintaining an electric arc to the charge in a furnace and forcing air and combustible material into the chamber around the arc.

One feature of my invention relates to the control of the nature of the flame by means of control of the combustible material or the ratio of oxidizing gas to fuel. I may thus maintain reducing or oxidizing conditions independently of the temperature control.

In one modification I may use my process in connection with a shaft furnace; and in another modification I may use it in a hearth type furnace where the flame extends thru the furnace chamber.

In certain modifications I contemplate the use of finely divided carbonaceous fuel, such as powdered coal which is burned with air in conjunction with heat from an arc in contact with the flame.

In certain modifications, I introduce solid substances thru the tuyères, such as flux materials or oxides, which may act on the charge or be reduced in the furnace; and in certain modifications I use direct current arcs from electrodes to the charge and I use also high voltage arcs.

My invention will be better understood by reference to the annexed drawing.

In the drawing annexed Fig. 1 is a sectional elevation of a combustion-arc furnace embodying my invention.

Figure 1:
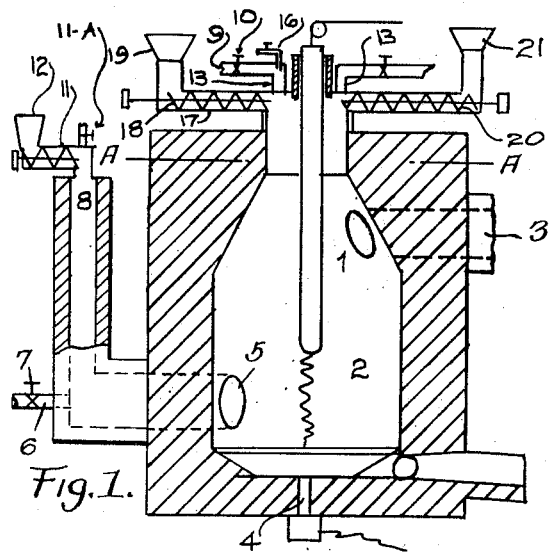

The furnace of Fig. 1 may be used alone or it may be attached and used in conjunction with other furnaces, such as a shaft furnace or a hearth furnace.

Figure 2:
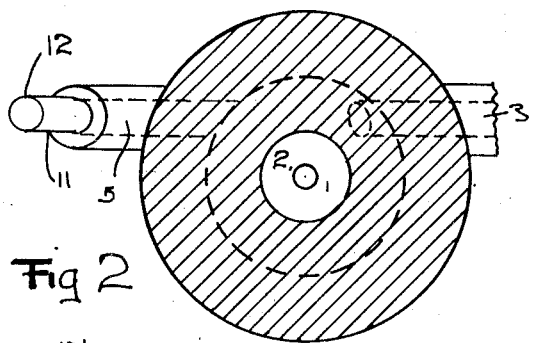
Fig. 2 is a plan view partly in section of the furnace shown in Fig. 1.

Referring to Fig. 1 and Fig. 2, I have shown here a main chamber 2 surrounded by walls of refractory material. The lower part of this chamber may serve as a hearth. In this modification of my invention I have shown a bottom electrode 4 which makes contact with the molten metal above it and the metal serves as the terminal of the arc from the adjustable electrode 1 shown above the hearth. Where a plurality of electrodes arc to the bath in the hearth of the chamber, the use of a bottom electrode is optional.

In the operation of the furnace of Fig. 1 a flame may be forced into the chamber 2 around the electrode 1 by burning powdered coal and air. At the upper part of the chamber 2 in Fig. 1 are shown entrance pipes for powdered coal and for air and for oil and for other material which it may be desired to subject to the intense heat of the combined arc and combustion flame. Thus the pipe 13 serves for the admission of the blast and additional or separate air may enter thru the pipe 16. Also oil may enter thru the pipe 9 controlled by the valve 10 or vice versa. Powdered coal may be caused to enter thru the pipe 17 by means of the screw conveyor 18 from the hopper 19. Other materials may be admitted into the combustion-arc chamber 2 by means of the screw 20 from the hopper 21. Or the solid material may be admitted along with the powdered coal thru the hopper 19 in the proper proportions for the desired reactions to take place. Oxidizing and reducing agents may be admitted in this manner.

I have also shown in connection with this Fig. 1 a chamber 5 which may be a combustion chamber operating in conjunction with the arc from the electrode 1 to the charge beneath. The combustible fuel and air may enter thru this tuyère chamber and be forced around the arc whereby the flame passes into the combustion chamber and hearth chamber 2. This nozzle may be used alone or in conjunction with the one above the chamber 2. In the tuyère shown at the lower left side of the Fig. 1, namely chamber 5, the air may be admitted under pressure thru the pipe 6 and controlled by a valve 7. Powdered coal may enter thru the opening 8. Oil may be admitted thru the pipe 9 and controlled by the valve 10. Oil may be used with or without powdered carbonaceous material like coal. Gas may be used in place of oil or coal or in conjunction with either of them. The control of the relative amounts and the total amounts of coal and other material may be by means of the screws such as shown in the pipe 11. The solid material may be mixed before charging into the hopper 12 if desired. Gaseous matter may be discharged from the chamber 2 through the exiting port 3.

The chamber of Fig. 1 may be used as an independent furnace or it may be attached to the side of a shaft furnace like a cupola or to a hearth furnace so as to form the combustion chamber or part of it. The main chamber in a hearth furnace serves for the expansion of the combustion gases and for the flame.

I have found that a direct current arc is very serviceable for use of blast and flame combustion heating. The direct current arc may be readily controlled by means of regulating the voltage of the arc or arcs from a direct current generator. A motor generator set or synchronous motor may be employed and when desired the direct current arcs may be replaced by alternating current arcs to finish the heat. The alternating current arc is shorter for the same voltage and temperature and other conditions. The arcs may impinge and terminate on the surface of the charge; for example in a cupola several arcs from separate electrodes may terminate and combine on the charge. A bottom electrode may be used when desired. In a hearth furnace the combustion tuyères may be vertical or horizontal or in certain modifications they may be changed from one position to the other, for example by rotating the furnace.

Figure 3:
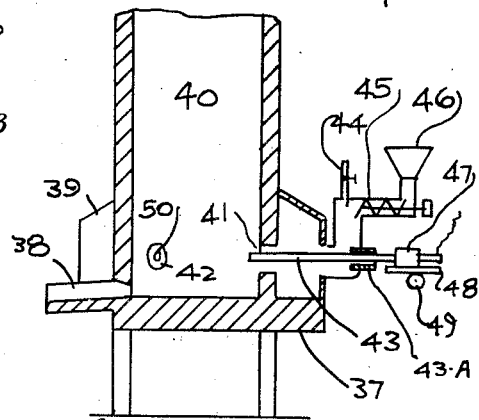
Fig. 3 is a sectional elevation of a shaft furnace embodying my invention.
Figure 4:
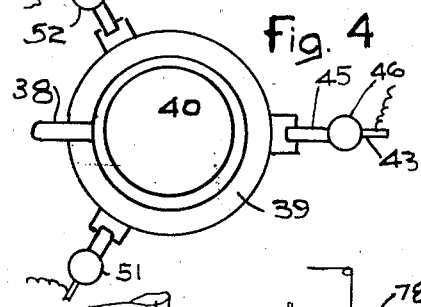
Fig. 4 is a plan view of the furnace of Fig. 3.

The modification of my invention in which combustion-arc chambers are attached to a shaft furnace is shown in Figs. 3 and 4. The Fig. 3 shows a sectional elevation of a cupola or shaft furnace equipped for carrying out my invention, and Fig. 4 shows a plan view of this apparatus of Fig. 3. In these figures the main shaft of the cupola or shaft furnace is indicated at 40. A wind box or tuyère box is shown at 39 encircling the lower portion of the cupola. This box forms a part of the combustion apparatus. An electrode 43 held in a suitable clamp for adjusting its position, is shown entering the tuyère chamber. The clamp 47 may be operated by means of a rack and gear shown at 48 and 49 in order to regulate the electrode. This provides means for adjusting the length of the arc and also to withdraw the electrode from the furnace. The arc may be started by moving the electrode to make it contact with the charge and then drawing it back to regulate the arc. Other electrodes are shown at 50 and 51 spaced around the shaft so that the electrodes all point towards a common point. The arcs from all three electrodes may terminate on the charge in the shaft.

Alternating or direct current may be used. In one modification I may use direct current from a direct current generator and may regulate the voltage from low to high and vice versa by means of regulating the field of the generator. For example in such a furnace using relatively low voltages I may use arcs of from 60 to 120 volts direct current terminating on the charge, that is the voltage between the electrode and the charge may be varied within these limits but it is understood that I do not limit myself to such low voltages.

In another modification I may use three phase alternating current, and the charge may form the neutral or at any rate all three arcs may terminate on it. Instead of relatively low voltages I may use very high voltages between electrode and charge and in such case may use either alternating or direct currents and may regulate the arc voltage or rather the voltage between electrode and charge as for example by means of regulating the generator field or in other ways.

The gas blown around the arcs and into the shaft of the furnace shown in this figure may be of controlled composition according to the nature of the chemical or metallurgical action desired. The gas may burn with an excess of air and be oxidizing so as also to burn the coke where a charge in the shaft furnace is made in somewhat usual manner, having alternate layers of coke and iron. Or the gas may be reducing, as for example by admitting a limited proportion of air or oxygen containing gas in relation to the reducing or carbonaceous component. The gas may be fuel gas. Or oil may be admitted and burned to make either a reducing gas flame or a combustion flame. I have shown a pipe 44 to indicate a supply of oil, and also a pipe 45 thru which powdered coal may be admitted and used in a manner like that already described. These sources of supply of coal and oil and air are provided of course with suitable valves for their control and regulation of the proportions and amounts of each to be admitted.

Thus, for example, I may charge the cupola with alternate charges of coke and metal or coke and ore, and may blow gas in thru the tuyères around the electrodes while maintaining an arc to the charge. In doing this the proportions of air and fuel in the gas may be regulated in order to give the amount of burning desired and the electric heat generated in the arcs supplies the additional heat. Of course there is heat generated in the reactions which take place in the furnace also. I may however, introduce an excess of oxidizing gas and so burn the coke in the shaft furnace charge and supply additional heat while doing this by means of the arcs to the charge in the shaft. This modification my be used either for iron melting cupols or for ore reduction shaft furnaces.

Figure 5:
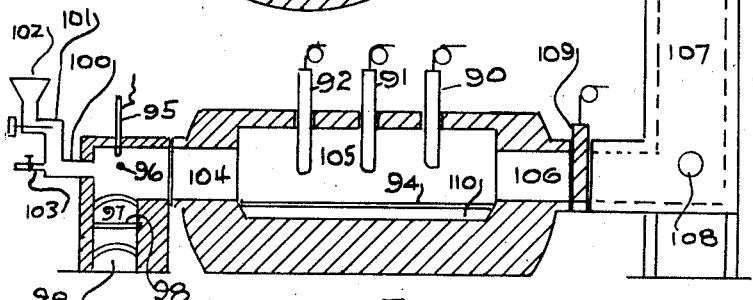
Fig. 5 is an elevation view of a hearth furnace embodying combustion arc chambers.
Figure 6:
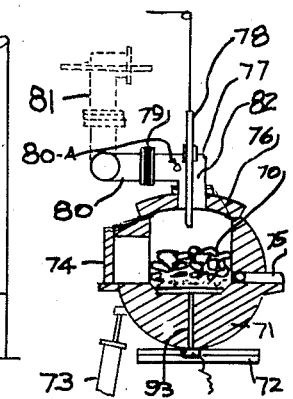
Fig. 6 shows a different modification of the apparatus of my invention embodying the use of a tuyère and for combustion-arc heating.
Figure 7:
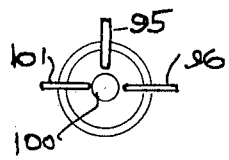
Fig. 7 is a view in section of part of a combustion-arc chamber.

I have shown a different modification of my invention in Figs. 5 and 6. These show a combination hearth furnace and combustion-arc chamber. In Fig. 5 I have shown a hearth type furnace equipped with fuel burner at one end and shaft or stack at the opposite end and having adjustable arcing electrodes entering thru the roof of the main furnace chamber for arcing to the charge. In Fig. 6 there is shown a sectional elevation view of a modified form of combustion-arc tuyère in combination with a hearth furnace similar to the main chamber of Fig. 5. In Fig. 7 I have shown a sectional elevation view thru the arm chamber of the furnace apparatus shown in Fig. 5.

Referring first to the apparatus of Fig. 6 the main chamber for containing charge is shown at 70 this numeral indicating the charge in that chamber. A tuyère pipe is shown at 80 and an electrode 78 enters this tuyère pipe and electrical insulation is shown at 79. However the electrode may enter the combustion pipe in the same manner as shown in Fig. 1 thru a suitable insulating bushing. In operation the current from this electrode 78 passes thru the arc and terminates on the charge and may be led out through the bottom electrode 93 or, in case other electrodes are used the three arcs may terminate on the charge and the charge then forms the neutral point of the three phase connection.

The combustion-arc tuyère is shown movable. The pipe 80 may be revolved upwardly to the position shown by the dotted lines at 81. When the use of the combustion-arc flame is not desired the pipe 80 may be moved upward and the electrode 78 along with it. When this is done other electrodes like those shown at 90, 91 and 92 in Fig. 5, may be inserted thru the electrode holes in the furnace chamber roof and these may be used for arcing to the charge and for heating it thereby after melting.

Fig. 5 shows the hearth after melting, the molten metal being indicated at 110 and it is covered with slag 94. The operation of the combustion-arc tuyère 80 is carried out in a manner similar to the operation described for the other combustion-arc chambers. A flame produced by combustion of combustible materials may be formed from this tuyère around the arc from the electrode to the charge. The combustion may be of oil, or coal or gas or other material, and likewise other material may be admitted thru this pipe. The arcs may be direct or alternating and may be of high voltage and relatively long. The gas entering around them protects the parts of the tuyère from the high voltage arc and directs the arc away from those parts.

The operation may be carried out by treating the charge with high voltage combustion arcs or high voltage arcs with gas blown around them, and subsequently these arcs may be stopped and lower voltage arcs used to finish the treatment, using, for example, the electrodes 90, 91 and 92. The lengths of the arcs may be controlled by adjustment of the electrodes and the voltages may be controlled in conjunction therewith.

I have shown the furnace of Fig. 5 fitted with another combustion-arc chamber at the left end of the furnace. A grate 98 is shown on which coal may be burned, being charged thru a door indicated at 97 and the ashes removed thru the part 99. A combustion-arc tuyère is shown at 82. This apparatus may be used either during melting or after melting. This apparatus may be used in conjunction with arcs formed between the ends of the electrodes 95, 96 and 110 shown in the sectional view of Fig. 7. Thus the combustion flame may come from the pipe 100, and the combustible material may be oil admitted thru pipe 101 or carbonaceous material such as powdered coal, and air may be admitted thru the pipe 103, controlled by valve. The flame from this burner may be blown directly into the arc formed between the electrodes instead of along the arc or around the arc as shown in the modifications already described. The combustion gas flame from this burner enters the main chamber thru the chamber 104 and thru the main chamber 105 and out thru the opening 106 when the door 109 is raised and thence up the shaft or stack 107.

The sectional view shown in Fig. 6 shows a charge door 74 and a tapping spout 75 and the furnace may be rolled over to pour out the molten contents. The roof 76 may be made removable for charging thru it.

In the modification of my invention shown in Fig. 1 there is shown the method of heating which combines a combustion flame from the upper end of the tuyère chamber downward in the same direction as the arc, the flame passing beside it and coming in contact with it and going in the same general direction. The source of the flame is the apparatus at the upper end of the combustion-arc chamber, namely the pipes which admit the combustible gas or fuel and air. These are separate from the sleeve around the electrode and the arc, of course, extends from the end of the electrode and terminates on the charge below. The gas blast passes over and by the end of the electrode from which the arc jumps and extends. The arc extends in the same longitudinal direction as the flame.

The use of the tangential stream of flame from the combustion burner at the left side of the chamber of Fig. 1, serves to direct the arc and the gas keeps the arc in the center part of the arc chamber. The cooler combustible gas or air entering outside the arc protects the apparatus from the heat of the arc and prevents the arc from terminating at the upper end of the combustion chamber.

In the operation of the furnace shown in Fig. 5 when modified to operate with combustion-arc tuyères or burners in the top, similar to the tuyères shown in section in Fig. 6, such a tuyère or burner would be mounted above each of the electrode holes where the electrodes 90, 91 and 92 are now shown in Fig. 5, in place of the electrodes shown. Each of these burners would then provide means for a flame to extend downwardly along the arc until the flame would be deflected by the charge and then move toward the flue or stack towards which the main flame would move. The arcs from these individual combustion-arc tuyères would terminate on the charge or bath beneath at different points along the main flame path through the chamber from the left end towards the stack.

Finely powdered coal may be introduced to form the combustion flame. Finely powdered flux material may also enter thru the combustion-arc burners.

Direct current may be used and any electrolytic effect from such direct current is part of my invention.

The electrode shown in Fig. 6 in the tuyère-burner is coaxial with the end of the pipe 77 where it rests on the furnace roof. The electrode extends beyond this into the furnace chamber.

The tuyère burners shown in Fig. 3 and Fig. 4 have their axes directed towards the center of the furnace and the flames meet in the furnace shaft. The insulating bushings for the electrodes where they enter the tuyère tubes may be seen at 43A where the electrode 43 passes thru the metal part of the box. The opening thru the refractory wall of the chamber shown at 41 is where the combustion flame passes into the shaft and the electrode extends thru this.

My invention may be used in various combinations of the apparatus parts and the operation steps without getting away from the novel combinations which constitute my invention.

I may regulate the proportions of combustible fuel and air and I may regulate the relative amounts of heat from combustion and from electric energy. My invention makes it possible to provide a control of the heat and of the chemical action of the flame which heretofore has not been possible without electric heat.

In the operation of my invention I may cause powdered coal to enter near the electrode and above it thru one of the entrance pipes shown in the upper part of Fig. 1 and cause the arc to form along this stream of carbon whereby the carbon forms part of the resistor and the air enters outside the arc.

It is also understood that I may use the combustion arc process, for example in the furnace of Fig. 5 or Fig. 6 and then stop the combustion flame and finish with the electrodes only arcing to the charge, for example the electrodes shown at 90, 91 and 92 in Fig. 5.

What I claim is:

1. In heating by a combustion flame and an electric arc superposed on and extending longitudinally of the flame, the process which consists in establishing the stream of the flame and the arc from independent sources, and in directing the arc to and along the flame stream by a gaseous blast which is passed over the arcing portion of the electrode.

2. In the process of heating by a combustion flame and a superposed arc originating at a source spaced from the source of a stream of flame, the step which comprises directing the arc to and along the flame stream by a blast passing over the arc source at such a velocity that the arc cannot strike back to the blast producing nozzle.

3. In heating by the joint working of combustion flames and electric arcs, the process which consists in projecting a blast of oxidizing gas mixed with fuel from a nozzle and igniting the same to establish a stream of flame, forming an arc between portions of rigid electrodes spaced from said nozzle and at different points along the stream of flame, and maintaining the velocity of the fuel mixture such that the arc cannot strike back to the nozzle.

4. The process of heating mobile substances at high temperatures which comprises establishing a stream of flame and an arc from independent sources, directing said arc upon and along said stream of flame by a gaseous blast, and blowing into said flame stream the mobile substances to be heated.

5. The process of electrolytically treating mobile substances at high temperatures, which comprises establishing a stream of flame, superposing upon said stream of flame a direct current arc established between electrodes having their arcing portions located at different points along the stream of flame and spaced from the source thereof, and introducing said mobile substances into said flame stream by a gaseous blast.

6. In apparatus for heating by the joint use of an electric arc and a combustion flame, means for superposing an arc upon and along a stream of flame, comprising an electrode, a nozzle for directing a blast over the arcing portion of said electrode and along the stream of flame, and means for delivering a gaseous blast from said nozzle and over said electrode at such velocity that the arc cannot strike back to said nozzle.

7. Apparatus for heating by superposing an electric arc upon and along a combustion flame, comprising a nozzle for delivering a gaseous blast to a stream of flame, and an electrode having its arcing portion in the path of the gaseous blast, said arcing portion being so spaced from the nozzle that the gaseous blast prevents the arc from striking back to the nozzle.

8. Apparatus for heating by superposing an electric arc upon a flame, the combination with a nozzle for projecting a stream of flame, of a plurality of electrodes having the arcing portions thereof spaced from said nozzle and at different distances therefrom.

9. In apparatus for combined combustive and electric heating, a nozzle electrode comprising a nozzle having a bore therethru for projecting fuel and oxidizing matter into a stream of flame, and an electrode coaxial with said bore and having an arcing portion projecting beyond said nozzle.

10. In apparatus for combined combustive and electric heating, the combination with a plurality of nozzles arranged with their bores directed towards the space to be heated, of means for projecting combustible matter and oxidizing gas from said bores, and rigid electrodes having their arcing portions spaced from said nozzles.

11. In apparatus for supplying electric energy to the space of action of fuel combustion, the combination with nozzles having within and spaced apart from the walls of their bores, substantially integral electrodes projecting beyond the ends of said nozzles, of means for producing combustion flames from said nozzles and surrounding said electrodes, and means for supplying electricity of suitable electromotive force to said electrodes to cause electric arc conduction in said flames.

In witness whereof, I have hereunto subscribed my name this 28th day of December, 1926.

ALBERT E. GREENE.